Feb. 24, 1942.  D. FISCHBEIN  2,273,947
CLUTCH AND BRAKE MECHANISM
Filed Oct. 5, 1939  2 Sheets-Sheet 1
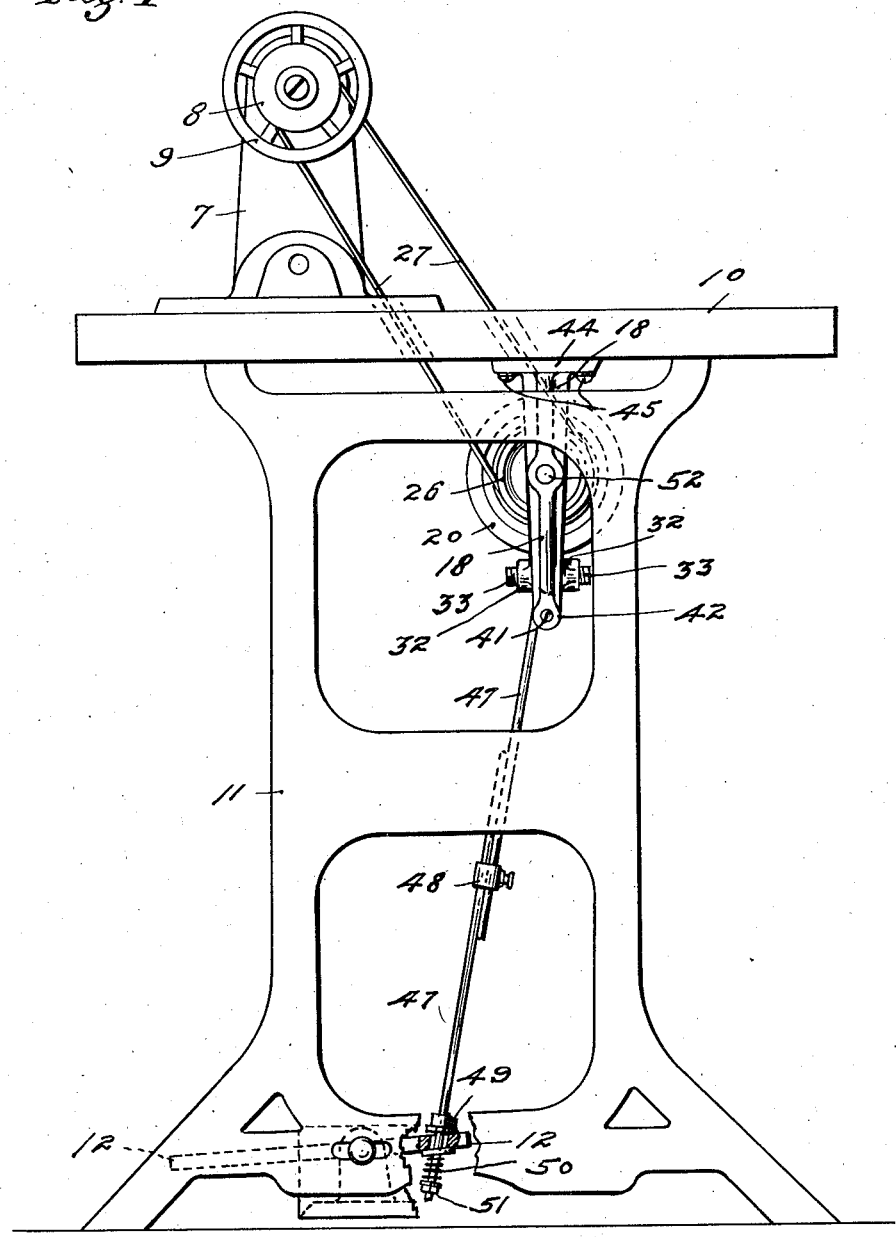
INVENTOR
David Fischbein
By his Attorney
Harry D. Kilgore Feb. 24, 1942.  D. FISCHBEIN  2,273,947
CLUTCH AND BRAKE MECHANISM
Filed Oct. 5, 1939  2 Sheets-Sheet 2
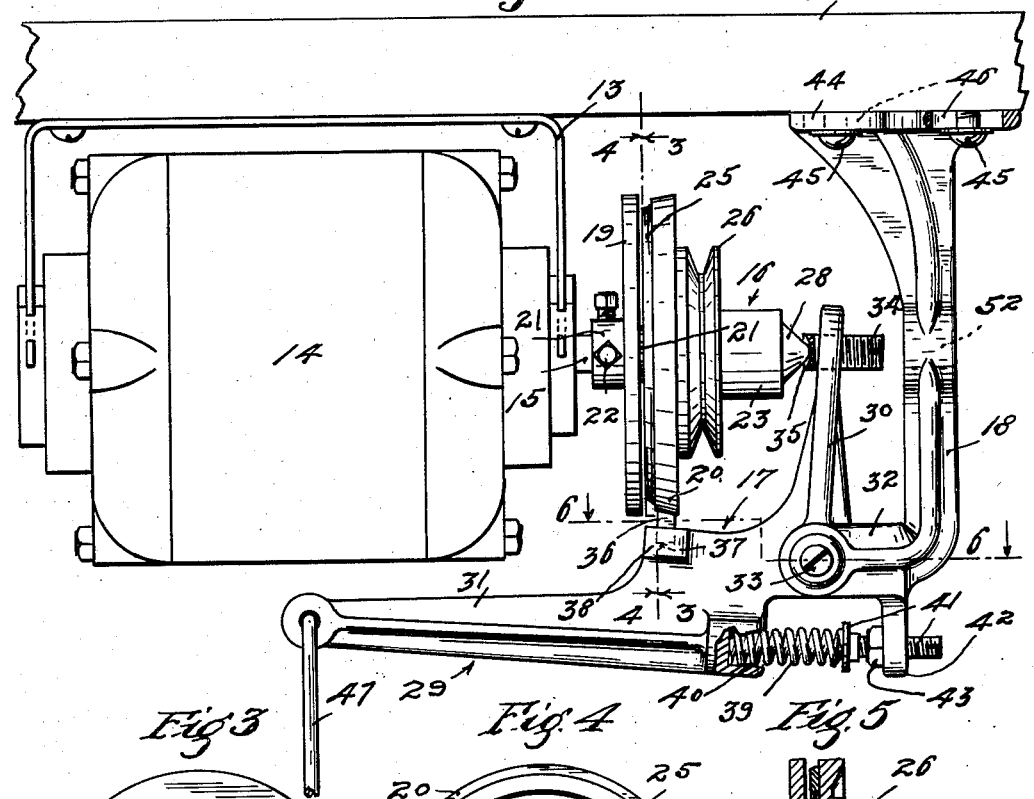
INVENTOR
David Fischbein
By his Attorney
Harry D. Kilgore Patented Feb. 24, 1942

2,273,947

UNITED STATES PATENT OFFICE 2,273,947

CLUTCH AND BRAKE MECHANISM

David Fischbein, Minneapolis, Minn.

Application October 5, 1939, Serial No. 298,065

1 Claim. (Cl. 192—17)

My present invention relates to clutch and brake mechanism intended for general use, but especially well-adapted and intended for use in connection with driving connections from an electric motor and, more particularly, with the driving connections for a power sewing machine.

It is an object of this invention to provide a friction clutch assembly in which the driven and driving members thereof are self-aligning.

A further object of the invention is to provide a clutch assembly that is applicable to the armature shaft of an electric motor and, when applied thereto, is self-aligning therewith.

A still further object of the invention is to provide a bearing and brake assembly having a bracket for attaching the same to a support independent of the motor and clutch assembly.

Other objects of the invention will be apparent from the following description had in connection with the accompanying drawings.

To the above end, generally stated, the invention consists of the novel devices and combinations of devices hereinafter described and defined in the claim.

In the accompanying drawings, which illustrate the invention, like characters indicate like parts throughout the several views.

Referring to the drawings:

Fig. 1 is a right end elevation of a power sewing machine having the invention embodied therein;

Fig. 2 is a fragmentary view in front elevation of the invention as shown in Fig. 1, but on an enlarged scale;

Figs. 3 and 4 are views principally in face elevation with some parts sectioned on the irregular lines 3—3 and 4—4 of Fig. 2, respectively;

Fig. 5 is a view principally in section taken centrally through the clutch assembly as shown in Fig. 2; and Fig. 6 is a fragmentary detail view partly in plan and partly in horizontal section taken on the irregular line 6—6 of Fig. 2.

The invention, as shown, is embodied in the driving connections from an electric motor to a power sewing machine. The sewing machine proper is indicated, as an entirety, by the numeral 7 with the exception of the driven V-pulley 8 mounted on and axially aligned with a handwheel 9. Said sewing machine 7 is mounted on a motor stand including a table 10 and a pair of leg brackets 11, only one of which is shown. A foot treadle 12 is mounted on the leg brackets 11. An electric motor, for operating the sewing machine 7, is mounted in a bracket 13, secured to the under side of the table 10, and holds said motor suspended therefrom at the back thereof. This electric motor is indicated, as an entirety, by the numeral 14 with the exception of its armature shaft 15.

The parts thus far described are of standard and well-known construction.

My invention now referred to in detail includes a clutch assembly 16 and a bearing and brake assembly 17 having a bracket 18 for attaching the same to the table 10. The clutch assembly 16 includes a driving disk 19 and a co-operating driven disk 20, the former of which has formed therewith a long hub 21 telescoped onto the armature shaft 15 and thereby self-aligned therewith. This hub 21 projects only a short distance from the outer face of the disk 19 and is secured to the armature shaft 15 by a plurality of set screws 22 having screw-threaded engagement therewith. These set screws 22 rigidly secure the disk 19 to the armature shaft 15 but permit axial adjustment of the same thereon and permit the removal of said disk therefrom.

The disk 20 is also provided with a long hub 23 which projects from each face thereof and has secured therein a bearing 24 telescoped onto the long or outer end portion of the hub 21 and self-aligns the disk 20 with the disk 19, see Fig. 5. The bearing 24 supports the disk 20 on the hub 21 with freedom for both axial and rotary movements. A ring of leather or other frictional material 25 is secured to the inner face of the disk 20 to drive the disk 20 from the disk 19. Formed with the disk 20 on its outer face is a V-pulley 26 aligned with the pulley 8. A belt 27 runs over the two pulleys 8 and 26 and drives the sewing machine 7 from the motor 14. Mounted in the outer end of the hub 23 is a cone bearing 28.

The bearing and brake assembly 17 includes a bell-crank 29 which extends in a vertical plane, and its arms are designated by the numerals 30 and 31. This bell-crank 29, at its elbow, loosely extends between a pair of laterally spaced bearing ears 32, on the lower end of the bracket 18, and is secured thereto by a pivot 33. As shown, this pivot 33 comprises a pair of opposing screws having screw-threaded engagement with the ears 32. These screws have conical inner ends mounted in correspondingly formed seats in the hub of the bell-crank 29. The bell-crank arm 30 is relatively short and extends upright from the pivot 33 at the right of the clutch assembly 16. A short heavy screw 34 extends transversely through the arm 30 at the outer end portion thereof, in axial alignment with the clutch assembly 16, and has threaded engagement with said arm. In the left-hand end of the screw 34 is a concave seat 35 in which the cone bearing 28 is mounted. The bell-crank arm 31 is relatively long and extends horizontally under the clutch assembly 16 and the motor 14.

A brake shoe 36 is removably mounted in a recessed seat 37 in a transverse lug 38 formed with the bell-crank arm 31 and bears circumferentially on the periphery of the disk 20 at the center and under side thereof. (See Figs. 2 and 4.) Normally, the bell-crank 29 is yieldingly held with the brake shoe 36 pressed against the disk 20 by a coiled spring 39. One end portion of the spring 39 is mounted in a recessed seat 40 in bell-crank arm 31 below the pivot 33 and forward thereof. The other end of the spring 39 is mounted on an adjustable spring base 41. This spring base 41 is a head-screw which extends transversely through a depending lug 42 on the lower end of the bracket 18, between the ears 32, and has screw-threaded engagement therewith. A lock nut 43 on the screw 41 holds the spring base 41 where adjusted. Obviously, by adjusting the spring base 41 in the lug 42, the tension of the spring 39 may be varied, at will, to increase or decrease the pressure of the brake shoe 36 on the disk 20.

The periphery of the driven member 20 is inwardly and transversely beveled toward the driving member 19, whereby when the brake shoe 36 is pressed against said periphery, it will cam said driven member axially away from the driving member 19 and at the same time stop the rotation thereof.

Normally the bell-crank arm 30 is yieldingly held moved away from the clutch assembly 16, thereby releasing the pressure of the friction member 25 on the disk 19. The bracket 18 has on its upper end a base 44 which bears on the under side of the table 10 and is detachably secured thereto by four wood screws 45 which extend through long slots 46 in said base. The slots 46 are arranged to permit the bracket 18 and hence the bearing and brake assembly 17 to be adjusted toward or from the clutch assembly 16.

The foot treadle 12 is employed to release the brake shoe 36 and move the disk 20 axially toward the disk 19 to bring its friction member 25 into contact with the disk 19 and thereby operate the sewing machine from the electric motor 14 by means of the driving connections heretofore described.

The foot treadle 12 is connected to the long arm 31 of the bell-crank 29 by means of a two-part connecting rod 47, the sections of which are overlapped and adjustably connected by a clamping collar 48. To connect the rod 47 to the long arm 31, the upper end portion of its upper section is bent laterally, inserted loosely through a hole in the free end of the long arm 31, and held in place by a cotter pin or other means, not shown. Said connecting rod 47 is loosely and adjustably connected to the treadle 12 by loosely inserting the same through an aperture therein. Applied to the connecting rod 47, above the treadle 12, is a stop collar 49. A spring 50, encircling said rod below the treadle 12, is compressed between said treadle and a washer and nut 51 applied to said rod.

The screw 34 on the inner end of which the cone bearing 28 is seated, at 35, may be adjusted toward or from the clutch assembly 16 by means of a screw-driver inserted through a transverse-hole 52 in the bracket 18.

From the above description, it is evident that the two disks 19 and 20, the hubs 21 and 23 of which are telescoped the one upon the other, are self-aligning. It is also evident that at the time the clutch assembly 16 is telescoped onto the armature shaft 15 of the motor 14, said assembly is self-aligned with said shaft. The set screws 22 permit the clutch assembly 16 to be axially adjusted on the armature shaft 15 to align the pulley 26 with the pulley 8.

The bearing and brake assembly 17 and the bracket 18 are a self-contained unit that is entirely separate from the motor 14 and the clutch assembly 16. Before this self-contained unit is secured to the table 10, by means of the bracket 18, the spring base 41 is retracted to permit the long arm 31 of the bell-crank 29 to swing downwardly and thereby afford considerable working clearance between the brake shoe 36 and the disk 20. At this same time, the screw 34 is also retracted. When securing the bracket 18 to the table 10, the long slots 46, through which the attaching screws 45 extend, permit said bracket to be adjusted toward or from the clutch assembly 16.

After the bracket 18 has been secured to the table 10, the spring base 41 is adjusted to compress the spring 39 and thereby lift the long arm 31 of the bell-crank 29 and yieldingly press the brake shoe 36 against the periphery of the disk 20. The tension of the spring 39 may be varied, at will, to suit the operator of the sewing machine. Next the screw 34 is adjusted to leave a sufficient working clearance between the friction member 25 and the disk 19 to prevent the disk 20 from being driven by the disk 19 when the brake shoe 36 is set.

To operate the sewing machine 7 from the motor 14, it is only necessary for the operator to move the treadle 12 in a direction to produce a slight downward pull on the connecting rod 47. This downward pull on the connecting rod 47 will rock the bell-crank 29 against the tension of the spring 39, release the brake shoe 36 and move the disk 20 axially toward the disk 19 to press its friction member 25 against the disk 19 and complete the driving connections from the motor 14 to the sewing machine 7. To stop the sewing machine 7, it is only necessary for the operator to release the downward pressure on the treadle 12 and permit the compressed spring 39 to rock the bell-crank 29 and thereby move the brake shoe 36 into engagement with the disk 20. This same movement of the bell-crank 29 will remove the pressure of the screw 34 on the bearing 28 and permit the disk 20 and its friction member 25 to move axially away from the disk 19.

From the above description, it is evident that the above described mechanism may be quickly and easily applied to a sewing machine and at the same time the parts thereof are accurately aligned and positioned.

The drawings illustrate a commercial form of the invention, but it will be understood that the same is capable of certain modifications as to details of construction, arrangement and combination of parts within the scope of the invention herein disclosed.

What I claim is:

The combination with a support and an electric motor mounted on the under side thereof, of a clutch assembly removably mounted on the armature shaft of the motor as a self-contained unit, said assembly including cooperating driving and driven friction members journaled, the latter on the former, with freedom for relative compound axial and rotary movements, said members being self-aligning with each other, a pulley on the driven member, and a second self-contained unit for setting the clutch and for braking the same, said second unit comprising a depending bracket entirely separate and independent of the motor and its mounting, said bracket having at its lower end a pair of laterally spaced bearing ears, a bell-crank, means connecting the bell-crank at its elbow to and between the bearing ears for adjustment in a horizontal plane in a direction transverse the longitudinal axis of said motor armature shaft and for pivotal movement in a vertical plane with one of its arms in an upright position outwardly of said armature shaft and with its other arm horizontally disposed and extending transversely under the clutch assembly, an adjusting screw having threaded engagement with the upright arm of the bell-crank, axially aligned with the clutch assembly and loosely engaging a part on the driven member for setting the clutch when pressed into engagement with the driven member, a brake shoe on the horizontally disposed arm of the bell-crank and arranged to engage the periphery of the driven member as a braking surface, said bracket having a depending lug below its bearing ears, the horizontally disposed arm of the bell-crank having a shoulder in opposing relation to said lug and horizontally spaced therefrom, a coiled spring compressed between the lug and the shoulder and normally holding the bell-crank with the brake shoe set and the clutch released, movable means carried by said lug constituting a seat for one end of said spring, means to move said seat to adjust the tension of the spring, said bracket being adjustably connected to said support for movement toward and away from said motor in a direction parallel to the longitudinal axis of said motor armature shaft, and a connection to the horizontally disposed arm of the bell-crank for operating the bell-crank against the tension of the spring to release the brake and set the clutch.

DAVID FISCHBEIN.